United States Patent Office 3,345,427
Patented Oct. 3, 1967

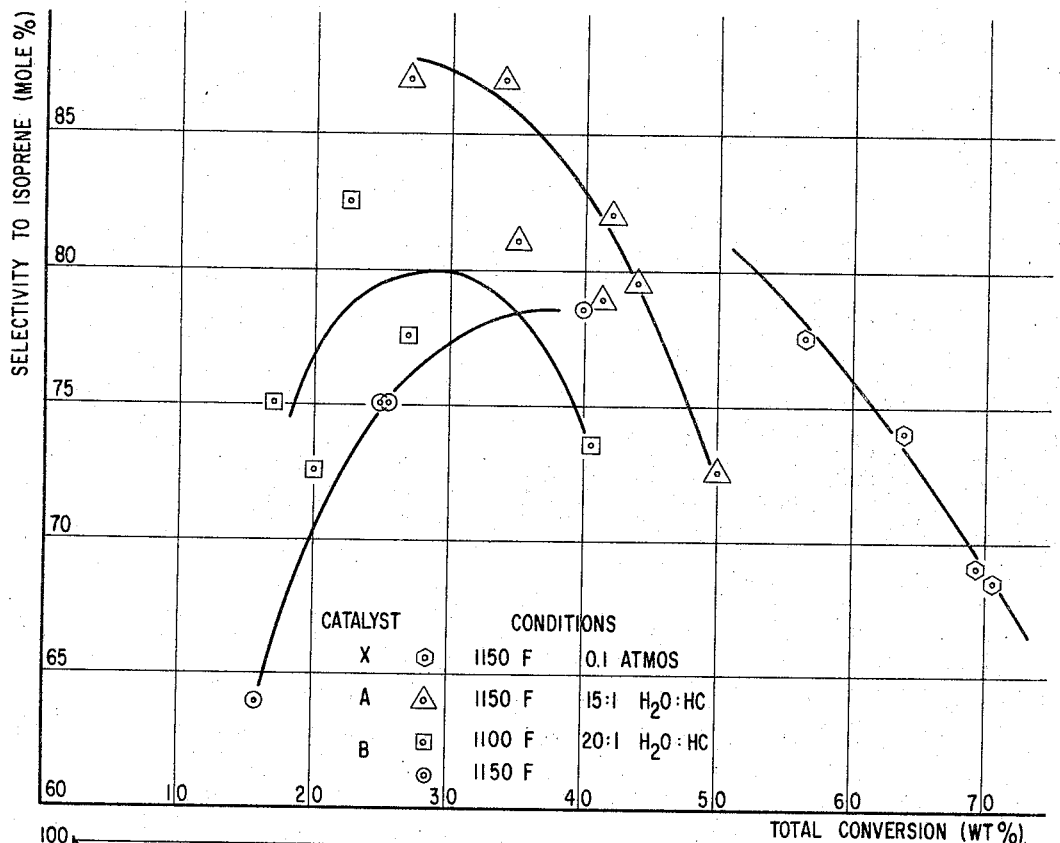
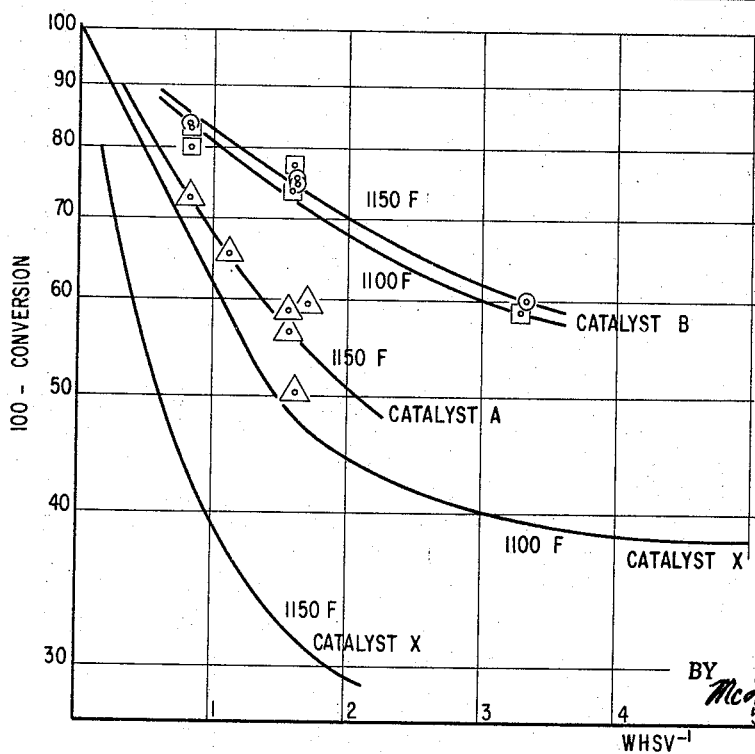
FIG. 1
FIG. 2

3,345,427
DEHYDROGENATION PROCESS AND ALUMINA-SUPPORTED NICKEL, MOLYBDENUM AND ALKALI METAL CATALYST THEREFOR
Glenn O. Michaels, South Holland, and James W. Gambell, Homewood, Ill., assignors to Sinclair Research, Inc., New York, N.Y., a corporation of Delaware
Filed Dec. 4, 1963, Ser. No. 328,001
9 Claims. (Cl. 260—680)

This invention relates to the dehydrogenation of hydrocarbons and more particularly to the dehydrogenation of hydrocarbons in the presence of a novel dehydrogenation catalyst.

The use of various metals in catalysts for dehydrogenation reactions has been known for some time. It is common knowledge that dehydrogenation reactions being endothermic necessitate the addition of heat to further the reaction and maintain the required reaction temperature. During the endothermic reaction the catalyst becomes depreciated in activity and selectivity for the required reaction for there is deposited on the catalyst a carbonaceous or hydrocarbonaceous material called "coke." Consequently, the materials must be subjected to a regeneration treatment, quite often after short periods of operation. Even when active catalysts are used there is a problem in obtaining a high degree of selectivity when operating under conditions which yield high conversions.

It has now been discovered that the problems of "coking" and inadequate selectivity in dehydrogenation reactions can be minimized by the use of a novel catalyst. In accordance with the present invention, the hydrocarbon to be dehydrogenated is contacted under dehydrogenation conditions with a catalyst consisting essentially of the oxides of nickel, molybdenum and an alkali metal supported on alumina. The catalyst is of high activity, gives high yields of the desired product and is only slightly affected by coking.

The invention will be described with reference to the drawings in which:

FIGURE 1 compares the selectivity of the novel catalyst of this invention with the selectivity of commercial catalysts commonly in use, and FIGURE 2 compares the activity of the catalyst of this invention with the activity of the commercial catalysts.

In accordance with the present invention the hydrocarbon to be dehydrogenated is contacted under dehydrogenation conditions with the catalyst consisting essentially of 0.5 to about 10 percent and preferably 2 to 6 percent nickel oxide, about 5 to 20 percent and preferably 10 to 15 percent molybdenum oxide and about 2 to 10 percent of an alkali metal oxide, the essential remainder being an alumina support. The vapor phase dehydrogenation process of the present invention is conducted under an elevated temperature, for instance, about 900 to 1250° F. For best results, the preferred temperature is about 900 to 1150° F. The dehydrogenation reaction should be carried out at atmospheric pressure, reduced pressure or in the presence of an inert diluent sufficient to lower the pressure of the hydrocarbon feed to an absolute pressure below about 1 atmosphere. The preferred hydrocarbon pressure is about 0.1 to 0.2 atmosphere. Increased selectivities are obtained at lower pressures, but this is offset by increased operating costs. Suitable inert gaseous diluents are nitrogen, methane and hydrogen. The contact time or weight hourly space velocity will be dependent on the catalyst, temperature, and pressure employed, but will generally range from about 0.1 to 5, preferably about 0.25 to 2 WHSV (weight of hydrocarbon per weight of catalyst per hour).

The catalyst of this invention shows a remarkable resistance to aging due to coke deposits on the catalyst. Dehydrogenation reactions using the catalyst have been run as long as 4 hours without regeneration of the catalyst and without signs of loss in activity. Other catalysts, such as a calcium nickel phosphate catalyst stabilized with chromia, show substantial loss in activity after 15 minutes to ½ hour on stream. Aging runs in a micro-reactor with our catalyst show no detectable loss in selectivity after from 4 to 12 hours on stream.

When dehydrogenating isoamylenes to obtain isoprene, the amount of undesirable piperylenes formed with our catalyst is unusually low. The isoprene to piperylene mole ratio ranged from values greater than 100:1 on the fresh catalyst to 60:1 with the catalyst in coked condition. These values should be compared with ratios of 10:1 to 30:1 obtained in our testing of existing commercial catalysts. A comparison of the selectivity of the catalyst of this invention (Catalyst X prepared as in Example I below) with two commercial catalysts is shown in FIGURE 1. Commercial Catalyst A contains iron, potassium and chromia while commercial Catalyst B is calcium nickel phosphate. The feedstock in these runs contained 88.9 weight percent 2-methyl-2-butene, 8.5 weight percent 2-methyl-1-butene and minor amounts of other pentenes and pentanes.

Data on the relative dehydrogenation activity of Catalyst X of this invention compared with Catalysts A and B can be found in FIGURE 2. The feed was that used in the runs represented by FIGURE 1 and the condition included those given in FIGURE 2 and a steam to hydrocarbon mole ratio of 20 to 1 when using Catalysts A and B and an absolute pressure of 0.1 atmosphere when using Catalyst X. The data indicate that Catalyst X is considerably more active than the commercial catalysts.

The feeds of the present invention are dehydrogenatable hydrocarbons, advantageously of 2 to 20 or more carbon atoms. The preferred monoolefinic feed has 4 to 8 carbon atoms and is branched chain, although similar straight chain or cyclic olefins can be used. Feeds in the $C_4$ to $C_8$ range may undergo dehydrogenation to yield dienes or aromatics. The aliphatic hydrocarbons may be substituted with an aromatic radical, for instance, an ethyl group that would undergo dehydrogenation to produce a vinyl-substituted or styrene-type molecule. The aromatic ring, preferably benzene ring, could also contain n-propyl, iso-propyl, n-butyl, iso-butyl or other alkyl substituents of at least 2 carbon atoms which undergo dehydrogenation. In addition, the aromatic ring could also contain groups that are stable such as tert-butyl or methyl groups that do not undergo dehydrogenation. The paraffins that are suitable feeds include the cyclic paraffins such as cyclo-pentane or cyclo-hexane. The cyclic paraffin can also contain aliphatic side chain substituents that can also undergo dehydrogenation. As an example, ethyl-cyclohexane would undergo dehydrogenation to produce styrene. The normal or branched paraffins in the $C_4$ to $C_2$ range would undergo dehydrogenation to produce monoolefins and dienes and are included in the scope of this invention. The hydrocarbons may be substituted with non-deleterious substituents.

The catalyst of this invention can be prepared by depositing compounds of nickel, molybdenum and potassium on an alumina support and calcining the resulting composition. Then nickel, molybdenum and potassium compounds can, if desired, be deposited in the form of an aqueous solution of water-soluble metal compounds. When the solution has been deposited, the impregnated alumina can be dried and then calcined or activated at an elevated temperature, for instance in the range of about 600 to 1300° F. A preferred temperature for calcining is about 900 to 1250° F. The metal compounds can be deposited on the alumina as the oxides or as compounds which convert to the oxide form during calcination.

The alumina employed in making the catalyst of the present invention can be any of the varieties of activated or gamma family aluminas or alumina hydrates such as Boehmite trihydrate or their mixtures. If the alumina used in making our catalysts is hydrous and not in active or catalytic form, it will become so during the calcination after the promoting metal components are added. Regarding the purity of the alumina it may be stated that small amounts of impurities are not generally detrimental, for example, commercially available alumina which may contain Fe and Na as impurities is an excellent support for the catalysts of this invention. The alumina may contain minor amounts of other components and the catalysts might contain metal promoters other than the alkali metals of the present invention. Although the catalyst is described as a mixture of oxides, it may be that two or more of the oxide forms are combined, for instances as in nickel molybdate.

The following examples are included to further illustrate the invention.

*Example I*

1500 g. of commercial alumina hydrate powder. *Analysis.*—33.1% volatile at 1000° C., 1.55% $SO_4$, 0.019% Fe, 0.153% Na, 60% crystalline in the form of Boehmite of about 30–40 angstroms crystallite size was mixed thoroughly with a solution of 256 g. $KHCO_3$, 425 g. $NI(NO_3)_2 \cdot 6H_2O$, 267 g. molybdic acid (85% $MoO_3$) and 7.5 molar $NH_4OH$ to make 2300 ml. This volume of solution was sufficient to completely wet the alumina powder without excess to permit a separate liquid phase. The impregnated powder was dried in a forced air oven for about 16 hours at about 230° F. 2119 g. of oven-dry powder was obtained which was mixed with 31 g. methyl cellulose, 21 g. of starch, and 1200 ml. of deionized water in a Simpson Intensive Mixer. The resulting dough was extruded $\frac{1}{16}$ in. diameter using a Welding Engineer's dual-worm extruder. The extrudate was dried in a forced-air drying oven at about 230° F., broken to less than ⅜ in. lengths, and made free of fines with a 14 mesh screen. The extrudate was then calcined in a muffle furnace programmed to heat to 1200° F. at about 200° F./hr. and then maintain 1200° F. for 3 hrs. The resulting catalyst was designated Sample No. 230-991-5014 (Catalyst X); *Analysis.*—0.17% volatile at 1200° F., 5.60% Ni, 15.1% $MoO_3$, 6.60% K.

*Example II*

A 158 g. portion of catalyst X was charged to a 1" Universal reactor. Temperatures were raised to the desired level in an air atmosphere. After conditions were lined out, a half hour prerun was made followed normally by a one hour run during which the products were collected and analyzed. The liquid product was analyzed for $C_3$-$C_6$ olefins and paraffins by gas chromatography over a 29' column of 10% quinoline on Chromosorb at room temperature. Non-condensible gases were analyzed by mass spectrograph and percent carbon yields on feed were determined by analysis of the coke on the discharged catalyst. After each run the catalyst was discharged from the reactor and coke removed by heating in air in a temperature muffle furnace. The activity before and after regeneration was the same in all cases.

Runs were made throughout the following range of conditions: 1000–1200° F., 0.25–2.0 WHSV, 0.1–0.15 atmospheres, 1 hour length of run.

The feedstock employed was Phillips Technical Grade 2-methyl-2-butene. VPC analysis of the feed showed it to contain:

| | Wt. percent |
|---|---|
| 2-M-2-butene | 88.9 |
| 2-M-1-butene | 8.5 |
| t-Pentene-2 | 0.6 |
| c-Pentene-2 | 0.2 |
| Pentene-1 | 0.1 |
| n-Pentane | 0.3 |
| i-Pentane | 1.4 |

Total conversion was calculated according to the formula:

$$\text{Total Conversion} = \frac{\text{wt. \% isoamylene in feed} - \text{wt. \% isoamylene in product}}{\text{wt. \% isoamylene in feed}}$$

$$\text{Selectivity to isoprene} = \frac{\text{wt. \% isoprene in product}}{\text{total conversion}} \times \frac{70}{68} \times 100$$

The results are summarized in the table below:

TABLE

| Run No. | 116 | 119 | 123 | 142 | 143 |
|---|---|---|---|---|---|
| Operating Conditions: | | | | | |
| Temperature, °F | 1,004 | 1,053 | 1,106 | 1,150 | 1,200 |
| WHSV | .21 | .24 | 1.22 | .57 | 1.22 |
| Press., mm. Hg | 75 | 77 | 112 | 60 | 60 |
| Length of run, min | 60 | 60 | 60 | 60 | 60 |
| Material balance | 103.1 | 104.1 | 94.7 | 100.8 | 95.4 |
| Total Conversion | 21.5 | 46.1 | 43.5 | 69.7 | 70.7 |
| Selectivity to Isoprene, mole percent | 83.3 | 68.9 | 78.0 | 69.0 | 68.4 |

We claim:
1. A catalyst suitable for the dehydrogenation of hydrocarbons consisting essentially of about 0.5 to 10 percent NiO, about 5 to 20 percent $MoO_3$, and about 2 to 10 percent of an alkali metal oxide deposited on an alumina support.
2. The catalyst of claim 1 wherein the alkali metal oxide is potassium oxide.
3. A method for the dehydrogenation of a dehydrogenatable hydrocarbon containing 2 to 20 carbon atoms per molecule which consists essentially of contacting the hydrocarbon under dehydrogenation conditions including a temperature of about 900 to 1250° F. with a catalyst consisting essentially of alumina, about 0.5 to 10 percent NiO, about 5 to 20 percent $MoO_3$ and about 2 to 10 percent of an alkali metal oxide.
4. The method of claim 3 wherein the hydrocarbon is a $C_4$ to $C_8$ monoolefin.
5. The method of claim 4 wherein the alkali metal oxide is potassium oxide.
6. The method of claim 5 wherein the hydrocarbon is isoamylene.
7. The method of claim 3 wherein the catalyst comprises 2 to 6 percent NiO, 10 to 15 percent $MoO_3$, 2 to 10 percent of an alkali metal oxide and 65 to 86 percent alumina.
8. The catalyst of claim 1 comprising about 2 to 6 percent NiO, 10 to 15 percent $MoO_3$, 2 to 10 percent of an alkali metal oxide and 65 to 86 percent alumina.
9. The catalyst of claim 8 wherein the alkali metal oxide is potassium oxide.

References Cited

UNITED STATES PATENTS

| 3,126,426 | 3/1964 | Turnquest et al. | 252—466 |
| 3,177,160 | 4/1965 | de Rosset | 252—465 |
| 3,189,661 | 6/1965 | Mulaskey et al. | 252—465 |
| 3,242,101 | 3/1966 | Erickson et al. | 252—465 |

DELBERT E. GANTZ, *Primary Examiner.*

G. E. SCHMITKONS, *Assistant Examiner.*